United States Patent [19]
Sekoguchi et al.

[11] Patent Number: 4,537,078
[45] Date of Patent: Aug. 27, 1985

[54] PRECISION PRESSURE GAUGE

[75] Inventors: Kotohiko Sekoguchi, 18-8, Hinosato 6-chome, Munakata-shi, Fukuoka-ken, Japan; Yoshiteru Sonoda, Osaka, Japan

[73] Assignees: Kotohiko Sekoguchi; Fujikin International, Inc., both of Osaka, Japan

[21] Appl. No.: 553,913

[22] Filed: Nov. 21, 1983

[30] Foreign Application Priority Data

Nov. 22, 1982 [JP] Japan ................................ 57-205287
Nov. 22, 1982 [JP] Japan ................................ 57-205288

[51] Int. Cl.³ .............................................. G01L 7/16
[52] U.S. Cl. ........................................ 73/744; 73/745
[58] Field of Search ................... 73/4 D, 745, 746, 744

[56] References Cited

U.S. PATENT DOCUMENTS 3,272,014  9/1966  Miks et al. ............................ 73/4 D
3,407,644 10/1968  Yasunami ............................. 73/4 D
4,413,526 11/1983  Delajound ............................ 73/745

Primary Examiner—Donald O. Woodiel
Attorney, Agent, or Firm—Griffin, Branigan & Butler

[57] ABSTRACT

A precision pressure gauge in which a sleeve is installed between the open section of a cylinder and the ram so as not to rotate the ram but only to rotate the sleeve, and the ram is actuated by fluids led into a cylinder chamber of the cylinder so that the force exerted on the ram is transmitted to a precision electronic weight measuring instrument for continuous high precision measurement of the aforementioned fluids.

8 Claims, 5 Drawing Figures

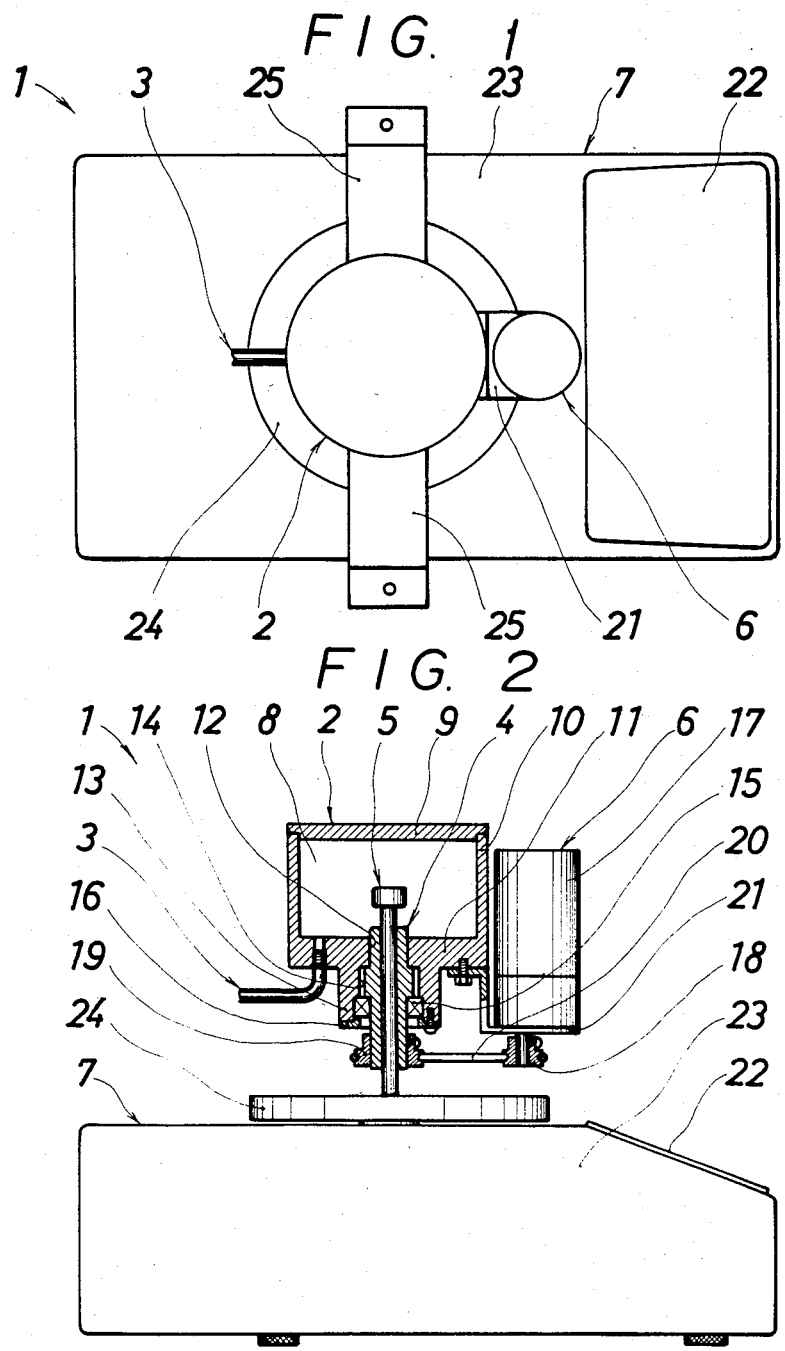

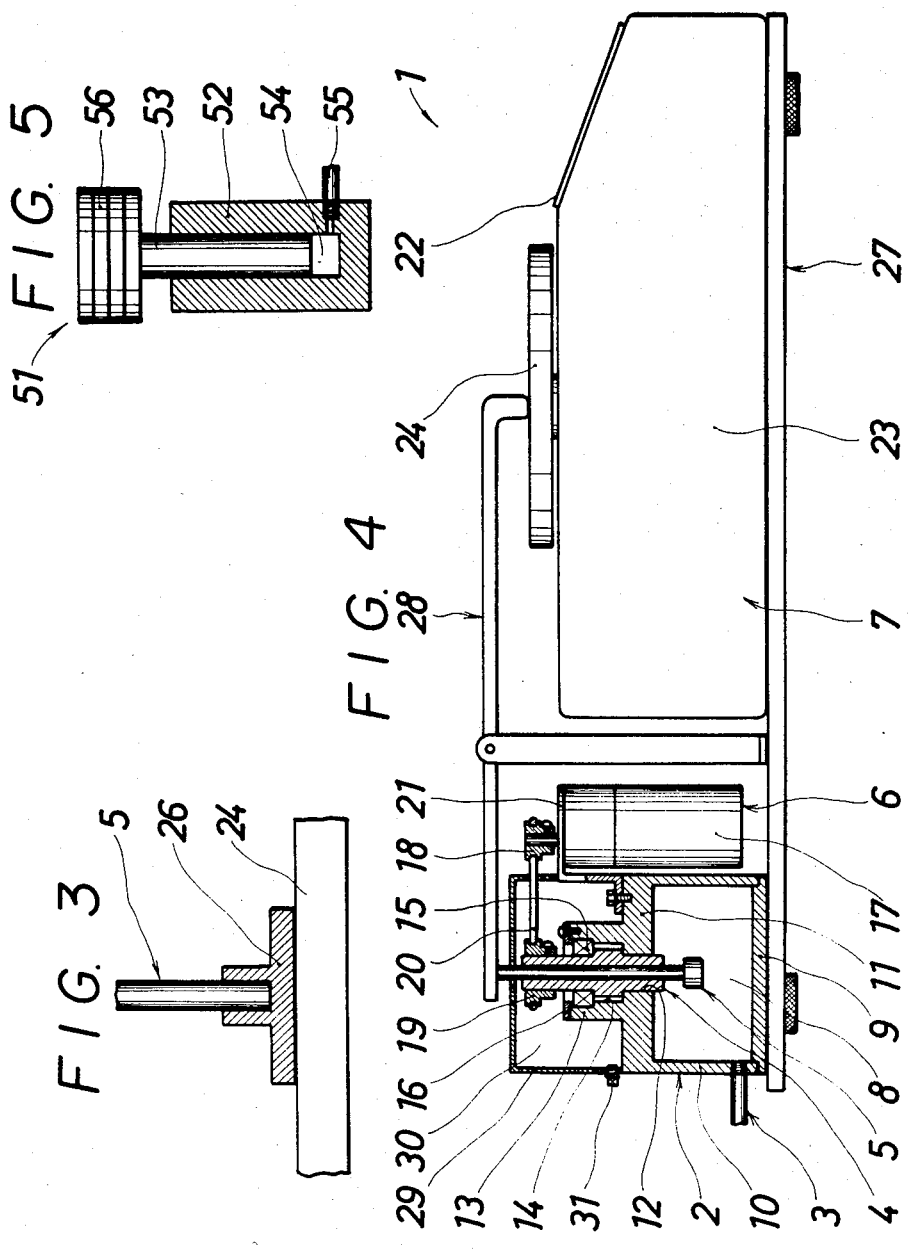

PRECISION PRESSURE GAUGE

BACKGROUND OF THE INVENTION

The invention is concerned with a precision pressure gauge which enables continuous high precision measurement of the pressure of fluids, or gases and liquids.

Conventionally, a dead weight loading type standard pressure gauge is used for high precision measurement of the pressure of fluids.

FIG. 5 illustrates the principle of a dead weight loading type standard pressure gauge 51. The pressure gauge comprises a cylinder 52, a ram 53 fitted in the cylinder allowing its free ascent and descent, a cylinder chamber 54 formed below the ram inside the cylinder, a pressure pipe 55 installed on the cylinder which leads to the cylinder chamber, and a dead weight 56 to be loaded on the ram; this measures the pressure of fluids by equilibrating the pressure of fluids led into the cylinder chamber 54 through the aforementioned pressure pipe 55 with the weight of the dead weight 56.

An actual dead weight loading type standard pressure gauge is constructed so as to rotate a ram within a cylinder by means of a rotation driving mechanism in order that frictional resistances of the cylinder 52 against the ram 53 are reduced, thus resulting in the improvement of the measurement accuracy.

However, with a dead weight loading type standard pressure gauge such as this, a measurement of the pressure of fluids performed by equilibrating the weight of a dead weight with the pressure of fluids occasions the following difficulties:

(1) This method of measurement is both time and labor consuming because frequent changes and placements of the dead weight on the ram are necessary to ensure the weight of the dead weight and the pressure of fluids are in a state of equilibrium. In addition, the incorrect placement of a dead weight will damage the head of the ram.

(2) In the case of rapid and continuous change in the fluid being gauged, measurement can not be performed continuously.

SUMMARY OF THE INVENTION

The present invention contemplates the creation of an improved instrument to solve the problems mentioned above.

It is the first object of the present invention to provide a precision pressure gauge which saves both time and labor and also one which enables the continuous measurement of fluid pressure.

It is the second object of the present invention to provide a precision pressure gauge with an improved measurement accuracy attained by allowing the smoother ascent and descent of the ram on which fluid pressure is actuated, and by reducing frictional resistance.

It is the third object of the present invention to provide a precision pressure gauge that eliminates the measurement errors which might be caused by the leakage of the fluid to be measured.

It is the fourth object of the present invention to provide a precision pressure gauge that allows for the possible creation of an automatic pressure control system.

The present invention comprises a cylinder in which a chamber with one open end is formed, a pressure pipe to lead the pressured fluid into a cylinder chamber installed in the cylinder, a sleeve that is so fitted with the open section of the cylinder as to rotate itself, a ram that is so fitted with the sleeve as to rotate itself and one end of which enters into the cylinder chamber while the other end of which protrudes, a rotation driving mechanism to rotate the sleeve, and a precision electronic weight measuring instrument equipped with a receiver on its upper part, to which the movement of the ram is transmitted; and actuates the ram by fluid led into the cylinder chamber; and transmits the force actuated by said ram directly or indirectly to a precision electronic measuring instrument which measures the pressure of the aforementioned fluid, improving the measurement accuracy by the installation of a sleeve between the open section of the cylinder and the ram so as not to rotate the ram but only to rotate the sleeve, and allowing the smoother ascent and descent of the ram to be actuated by the pressure of the fluid and thus reducing frictional resistance.

BRIEF DESCRIPTION OF THE DRAWINGS

FIG. 1 is a top view of a precision pressure gauge in relation to its first embodiment.

FIG. 2 is a front view of the aforementioned precision pressure gauge longitudinally cut to illustrate the major sections.

FIG. 3 is a longitudinal sectional view illustrating a pad which prevents the rotation of the ram employed in the aforementioned precision gauge.

FIG. 4 is a general front view of a precision pressure gauge in relation to its second embodiment longitudinally cut to illustrate the major sections.

FIG. 5 is an illustration showing the principle of a conventional dead weight loading type standard pressure gauge.

DETAILED DESCRIPTION OF THE INVENTION

FIG. 1 is a top view of a precision pressure gauge in relation to its first embodiment. FIG. 2 is a front view of the same gauge longitudinally cut to illustrate the major sections.

Major sections of the precision pressure gauge 1 in relation to its first embodiment of the present invention comprise a cylinder 2, a pressure pipe 3, a sleeve 4, a ram 5, a rotation driving mechanism 6, and a precision electronic weight measuring instrument 7.

The cylinder 2 is equipped with a cylinder chamber 8 inside that has one end which is open.

With this embodiment, the cylinder is equipped with a top wall 9, a surrounding wall with a larger diameter 10, a bottom wall 11, an opening 12 formed in the center of the bottom wall, and a surrounding wall with a smaller diameter 13 attached to the bottom wall. Inside the cylinder, cylinder chamber 8 is formed by enclosure with the aforementioned top wall 9, surrounding wall 10, and bottom wall 11. A recess 14 to house a bearing is formed on the inside enclosed with a bottom wall 11 and a surrounding wall with a smaller diameter 13.

A pressure pipe 3 is fitted on the cylinder 2 to lead a fluid under pressure into the cylinder chamber 8, the pipe being connected to the bottom wall 11 of cylinder 2.

A sleeve 4 is fitted into the open section of the cylinder 2 so as to rotate itself.

With this embodiment, the sleeve 4 is made of ceramic material of a cylindrical shape with a projecting part at the center area of the outer surface of the sleeve. The upper part of the sleeve 4 is closely fitted into the opening 12 formed on the bottom wall 11 of cylinder 2 so as to rotate itself. A bearing 15 is housed between the bottom area near the projecting part on the sleeve and a surrounding wall with a smaller diameter 13 allowing a smooth rotation of the sleeve 4 against the cylinder 2. The upper part of the sleeve 5 intrudes slightly into the cylinder chamber 8 while its lower part protrudes substantially downwards through the bottom of the cylinder 2.

The aforementioned bearing 15 is pressed with a bearing holder 16 fixed with screws onto the surrounding wall with a smaller diameter 13 of the cylinder 2.

The ram 5 is fitted into the center opening on the sleeve 4 so as to rotate itself.

The ram 5 is made of ceramic material and is a circular rod equipped with a head part at its top. The aforementioned head is situated in the cylinder chamber 8, and the bottom end protrudes substantially downwards through the lower end of the sleeve 4.

A rotation driving mechanism 6 rotates sleeve 4.

With this embodiment, the rotation driving mechanism 6 comprises a motor 17, a driving pulley 18 fitted on the axis of the motor, a driven pulley 19 fitted on the lower circumference of sleeve 4, and a belt 20 running over both pulleys. The motor 17 is firmly fitted onto a part of the cylinder 2 with an L-shaped bracket 21.

A precision electronic weight measuring instrument 7 which is already known comprises a main body 23 equipped with a display section 22, and a receiver 24 placed on the body. The weight of an object to be measured is displayed on a display section 22, and an arithmetic operation on the weight of the object to be measured is performed by taking a prescribed modification value or conversion value into consideration, to display the final numerical value after the operation.

A digital indication is desirable for the display system on the display section 22.

Both sides of the cylinder 2 are fixed onto the main body 23 of a precision electronic weight measuring instrument 7 with supports 25, while the lower end of the ram 5 makes direct contact with the upper surface of the receiver 24.

The embodiment of FIG. 2 operates as follows to measure the pressure of a fluid. The fluid is applied to cylinder chamber 8 through pressure pipe 3, and sleeve 4 is rotated by driving rotation driving mechanism 6.

A pressing force corresponding to the pressure of the fluid led into a cylinder chamber 8 acts downwardly on ram 5 and the pressing force is transmitted to receiver 24 on the precision electronic weight measuring instrument 7.

The pressure of fluids is displayed on the display section 22 after an arithmetic operation is performed on the aforementioned pressing force by taking a prescribed conversion value into consideration at the precision electronic weight measuring instrument 7.

Since the aforementioned sleeve 4 is rotated by means of a rotation driving mechanism 6 while the pressing force is applied to ram 5, sleeve 4 rotates while the ram remains unrotated.

Therefore, the pressing force applied to ram 5 is accurately transmitted to receiver 24 of the precision electronic weight measuring instrument 7, and the frictional resistance of a sleeve 4 against the ram 5 becomes practically negligible.

Both sleeve 4 and ram 5 which are made of high wear-resistant ceramic material allow the measurement under favorable conditions for a long period of time.

The rotation driving mechanism 6 need not be limited to the aforementioned embodiment, but any other mechanism to drive sleeve 4 can be employed.

The pressure of fluids detected with the precision electronic weight measuring instrument 7 can be fetched as an output, and the pressure of fluids can be indicated by output signals on a display section installed at a remote place.

Furthermore, a control of fluid pressure becomes possible by making use of the aforementioned output signals.

When the pressing force of ram 5 against receiver 24 is not sufficient due to low pressure, the ram may rotate along with sleeve 4. In such a case, as illustrated in FIG. 3, a pad 26 made of material such as rubber can be fixed to receiver 24 and beneath ram 5 as a turn-stopper.

In addition, a seal-type slide bearing can be fitted between sleeve 4 and ram 5 to allow a smooth rotation.

A second embodiment of the present invention is illustrated in FIG. 4 wherein a precision pressure gauge comprises a cylinder 2, a pressure pipe 3, a sleeve 4, a ram 5 and a rotation driving mechanism 6, the structure of which is almost the same as that of the first embodiment except that it is inverted. The gauge is fixed onto the base 27 together at one side of the precision electronic weight measuring instrument 7, and the ram 5 and the precision electronic weight measuring instrument 7 are indirectly connected with a directional conversion means 28.

Furthermore, a covering body 29 comprising a top wall and a surrounding wall is fixed on the upper part of the cylinder 2 to form a storage enclosure 30 for leaked fluids. The covering body 29 is equipped with an outlet which is normally stopped with a plug 31.

The directional conversion means 28 is installed between the upper end of ram 5 and the upper surface of the receiver 24 of precision electronic weight measuring instrument so that the upward movement of ram 5 is converted to the downward movement of receiver 24. With this embodiment, a lever with a fulcrum at its center part is employed for this purpose. It is so designed that the lower surface of one end of the lever touches the upper end of the ram 5, and the lower surface of the other end of the lever touches the upper surface of receiver 24.

Pressured fluids to be measured are lead into a cylinder chamber 8 through pressure pipe 3, and sleeve 4 is rotated by the rotation driving mechanism 6.

Upward pressing force works on ram 5 corresponding to the pressure of fluids led into cylinder chamber 8, and the pressing force is transmitted to the receiver 24 by means of the directional conversion means 28.

The pressure of fluids is displayed on a display section 22 after an arithmetic operation is performed on the aforementioned pressing force by taking a prescribed conversion value into consideration at the precision electronic weight measuring instrument 7.

Since the aforementioned sleeve 4 is rotated by means of rotation driving mechanism 6 while the pressing force is applied to ram 5, sleeve 4 rotates while the ram remains unrotated.

Therefore, the pressing force applied to ram 5 is accurately transmitted to receiver 24 of precision electronic weight measuring instrument 7 by means of directional conversion means 28, and the frictional resistance of the sleeve 4 against the ram 5 becomes practically negligible.

Since the sleeve 4 rotates around the ram 5 and within the cylinder, there exists a clearance between the ram 5 and the sleeve 4. Therefore, pressured fluids in the cylinder chamber 8 leak through the aforementioned clearance.

In the case of the pressured fluids being gases, there exists no problem. However, if they are liquids, there might occur errors in the measurement due to the weight of leaked liquids when they reach the receiver 24 of precision electronic weight measuring instrument 7.

However, this kind of measurement error is prevented by the device's construction which avoids having the fluids reach the directional conversion means 28 or the receiver 24 of the precision electronic weight measurement instrument 7 by gathering them into a storage enclosure 30. Leaked fluids stored can be drained regularly by the removal of the plug 31.

It is also possible to pump leaked fluids gathered in the storage enclosure 30 the original storage vessel which holds the liquids to be measured.

In addition, to make possible an accurate pressure measurement of gases, a gases-liquids pressure transmission means consisting of a diaphram, etc., might possibly be installed on the pressure pipe 3. In this case, gases to be measured are led into the gases-liquids pressure transmission means while liquids are trapped in an opening lying from said means upto the cylinder chamber 8.

Furthermore, a function to expand the up-and-down strokes of receiver 24 against the up-and-down strokes of ram 5 as well as a function to convert a direction can be added to the directional conversion means 28.

As described above, the present invention provides excellent performance with the following advantages:

(1) Time and labor are greatly saved when the pressure of fluids is measured.

(2) Pressure measurement becomes possible either continuously or intermittently.

(3) Excellent transmitability of the pressure from a precision electronic weight measuring instrument to the receiver is ensured since a ram does not rotate.

(4) By making the sleeve rotate, frictional resistance against the ram is practically negligible, thus resulting in an accurate measurement of the pressure.

(5) When both a sleeve and a ram are made of a ceramic material, an accurate pressure measurement under favorable conditions over a long period of time is guaranteed due to its high wear-resistant quality.

(6) When construction is performed giving consideration to the leakage of liquids in a cylinder chamber through the clearance between the ram and the sleeve, there are no influences of leaked fluids over a directional conversion means or a receiver of a precision electronic weight measuring instrument, thus preventing measurement errors and assuring an accurate pressure measurement.

(7) Input of signals transmitted from a precision electronic weight measuring instrument into a pressure control device enables an automatic pressure control by the preset programs.

What is claimed is:

1. A precision pressure gauge for measuring the pressure of a fluid applied thereto, said gauge comprising:
   a stationary cylinder having a cylinder chamber one end of which has an opening therein;
   means connected directly to said cylinder for applying said fluid to said chamber;
   a rotatable sleeve mounted in said cylinder;
   a ram extending through said rotatable sleeve and freely rotatable with respect to said sleeve,
      said ram having a first end extending into said chamber and a second end extending out of said sleeve;
   drive means for rotating said sleeve relative to said cylinder; and,
   weight measuring means including a receiver to which movement is imparted by axial movement of said ram in response to fluid pressure in said chamber.

2. A precision pressure gauge as claimed in claim 1 wherein said second end of said ram extends downwardly and said receiver is positioned so that its upper surface is in direct contact with said second end.

3. A precision pressure gauge as claimed in claim 2 wherein said ram and said sleeve are both made of a ceramic material.

4. A precision pressure gauge as claimed in claim 1 wherein said second end of said ram extends upwardly, said gauge further including direction conversion means responsive to upward movement of said ram for causing a downward movement of said receiver.

5. A precision pressure gauge as claimed in claim 4 wherein said ram and said sleeve are both made of a ceramic material.

6. A precision pressure gauge as claimed in claim 4 wherein said direction conversion means includes means for expanding said ram movement whereby a given axial movement of said ram causes a greater movement of said receiver.

7. A precision pressure gauge as claimed in claim 6 wherein said ram and said sleeve are both made of a ceramic material.

8. A precision pressure gauge as claimed in claim 1 wherein said ram and said sleeve are both made of a ceramic material.

* * * * *